(12) United States Patent
Huang et al.

(10) Patent No.: US 7,251,653 B2
(45) Date of Patent: Jul. 31, 2007

(54) METHOD AND SYSTEM FOR MAPPING BETWEEN LOGICAL DATA AND PHYSICAL DATA

(75) Inventors: Chih-Jen Huang, Kirkland, WA (US);
Steven Sheldon, San Diego, CA (US);
Robert Turner, Seattle, WA (US);
Patrick Conlan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 497 days.

(21) Appl. No.: 10/880,888

(22) Filed: Jun. 30, 2004

(65) Prior Publication Data

US 2006/0004750 A1    Jan. 5, 2006

(51) Int. Cl.
*G06F 17/30* (2006.01)
*G06F 7/00* (2006.01)

(52) U.S. Cl. .................. 707/6; 707/100; 707/203

(58) Field of Classification Search ............... 707/1–6, 707/100–102, 103 R, 104.1, 201, 203; 717/137, 717/141

See application file for complete search history.

(56) References Cited

U.S. PATENT DOCUMENTS

| | | | | |
|---|---|---|---|---|
| 5,734,887 A | * | 3/1998 | Kingberg et al. | 707/4 |
| 5,873,096 A | * | 2/1999 | Lim et al. | 707/201 |
| 5,937,402 A | * | 8/1999 | Pandit | 707/4 |
| 6,295,533 B2 | * | 9/2001 | Cohen | 707/5 |
| 6,457,003 B1 | * | 9/2002 | Gajda et al. | 707/4 |
| 6,490,590 B1 | * | 12/2002 | Fink | 707/100 |
| 6,687,704 B1 | * | 2/2004 | Russell | 707/100 |
| 6,711,582 B2 | * | 3/2004 | Aldridge et al. | 707/103 Y |
| 7,062,502 B1 | * | 6/2006 | Kesler | 707/102 |

OTHER PUBLICATIONS

Tolkin, Steven, "Aggregation Everywhere: Data Reduction and Transformation in the Phoenix Data Warehouse," Nov. 1999 (8 pages).
Michalk, Dale, "The DataSet Object: At Your Web Service," Copyright 2001-2003, Fawcette Technical Publications, (7 pages), http://www.fawcette.com/xmlmag/2001_1_11/magazine/columns/integration/dmichalk/default)pf.aspx.
NET Framework Class Library, DataSet Class, Copyright 2004 Microsoft Corporation (4 pages) http://msdn.microsoft.com/library/en-us/cpref/html/frlrfSystemDataDataSetClassTopic.asp?frame=true.

* cited by examiner

*Primary Examiner*—Jeffrey Gaffin
*Assistant Examiner*—Jacques Veillard
(74) *Attorney, Agent, or Firm*—Perkins Coie LLP

(57) ABSTRACT

The mapping system maps a physical table of a database to a logical table representing a logical view of the database that integrates standard columns and custom columns. The physical table includes a standard table with standard columns and a custom table with custom columns. The custom table may be implemented as a pivot table. The mapping system provides a map between standard and custom columns and logical columns. The physical table may include multiple standard tables. The mapping system allows for individual standard tables to be updated, rather than updating all the columns across all the standard tables for a row.

27 Claims, 9 Drawing Sheets project pivot table

| key | custom column UID | column value |
|---|---|---|
| 10 | project type | A |
| 20 | project type | B |
| 10 | project status | done |

311, 312, 313 — 310 custom column table

| custom column UID | name | data type | required |
|---|---|---|---|
| project type | type | text | yes |
| project status | status | text | no |

METHOD AND SYSTEM FOR MAPPING BETWEEN LOGICAL DATA AND PHYSICAL DATA

TECHNICAL FIELD

The described technology relates generally to mapping between logical data and physical data and including to mapping when the physical data includes custom data.

BACKGROUND

Many applications use a database to store their data. The database for an application is typically designed by the developer of the application to include a table for each entity used by the application. Each entity table contains a row for each specific entity and various columns for storing properties of the entity. For example, in the case of a project management application, the entities may include a project, a task, an assignment, or a resource, and a specific entity is a specific project, a specific task, a specific assignment, or a specific resource. The project table may contain a project identifier column, a project name column, a project start date column, and so on. The project identifier column contains the unique identifier of a specific project and is referred to as a "unique key" of the project table. Each row of the project table corresponds to a specific project, and the cells of a row contain the data of that specific project for the columns. A task table may contain a task identifier column, project identifier column, task name column, and so on. The task identifier column contains the unique identifiers of specific tasks. The project identifier column contains the project identifier of the specific project with which the task is associated and is referred to as a "foreign key." Each row of the task table corresponds to a specific task.

Complex applications may have many hundreds of properties associated with an entity. This presents problems for databases that limit the number of columns of a table. For example, some databases may limit the number of columns to 128 or 256. To overcome this problem, applications may store data for an entity in multiple database tables. For example, if an application needs 300 columns to represent the properties of an entity and the limit on the number of columns of a table is 128, then the developer of the application may divide the 300 columns across three tables with 101 columns in each table. Each table may contain a unique key column and 100 property columns. When the properties of a specific entity is added to the database, the application generates a unique identifier for that specific entity and adds a row to each of the three tables with its unique key set to that unique identifier. The combination of the rows from the three tables with the same unique identifier corresponds to the columns for the entity. To access the data for that specific entity, the application may join the three tables. As a result, at least for viewing purposes, the join results in a logical data view that contains the unique identifier column and the 300 property columns.

Even though these complex applications have many properties associated with an entity, referred to as "standard" properties or columns, users may need to have additional properties associated with an entity. For example, in the case of a project management application, a user may need to track project type and project status, which may have no corresponding standard column. To assist users in defining their own properties for an entity, applications may allow custom columns to be defined. For example, a user may define a type custom column and a status custom column to track the type and status of projects. The custom column can be considered just one more column associated with an entity.

Although custom columns could be supported by modifying the schema of the database, such modifications can be time-consuming and error-prone, especially if performed by the users of the application. To allow users the flexibility to create custom columns without modifying the schema of the database, some applications use a "pivot" table to store information relating to custom columns. A pivot table for an entity would typically include a key column, a custom column name column, and a data column. Whenever data for a custom column is to be added for a specific entity, a new row is added to the pivot table that contains the unique key associated with that specific entity, the name of the custom column, and the data.

The use of pivot tables to represent custom columns may make it difficult for a user to retrieve all the properties associated with a specific entity. In particular, although a join can be used to combine the data of standard tables, the data of the custom columns cannot be joined so easily. Moreover, even if with only standard tables are joined to provide a logical data view, some databases may not allow updates via the logical data view. It would be desirable to provide a logical data view that would integrate both standard columns and custom columns and would allow for the updating of data of both standard columns and custom columns via a logical data view.

SUMMARY

A method and system for providing a logical view of data that combines standard and custom fields is provided. The system creates a logical view of physical data that includes standard data of standard fields and custom data of custom fields. The system has a map that maps logical fields of logical data to the corresponding standard fields or custom fields of the physical data. The system uses the map to generate the logical view. When the custom fields are represented by pivot data, the system converts the pivot data so that it appears as a logical field. The system may allow the updating of data of a custom field via the logical view and a standard field when the standard fields are represented as standard columns of multiple standard database tables.

BRIEF DESCRIPTION OF THE DRAWINGS

FIG. 3 is a block diagram that illustrates sample data of a project pivot table and custom column table in one embodiment.

DETAILED DESCRIPTION

Figure 1:
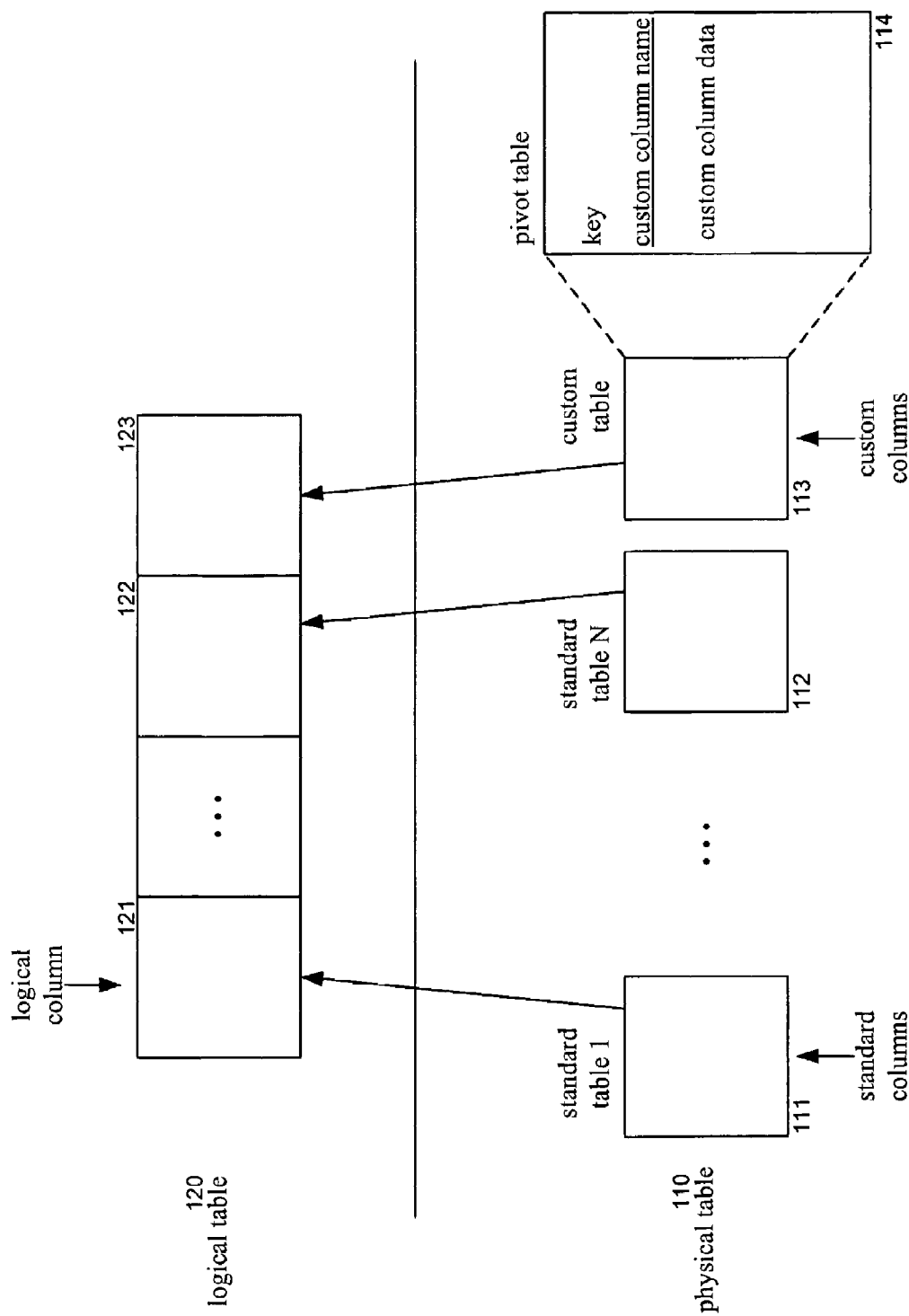
FIG. 1 is a block diagram that illustrates a physical table of a database representing an entity and a corresponding logical table in one embodiment.

A method and system for providing a view of data that combines standard and custom data is provided. In one embodiment, a mapping system provides a map between physical fields of physical data and logical fields of logical data. The physical fields may include standard fields and custom fields. The custom fields may be represented using pivot data. To create a view of the physical data, the physical data is queried to generate a result set that includes custom fields represented using pivot data and standard fields. The mapping system uses the map to generate a logical data view that integrates standard and custom fields in a way that hides from a user or client the distinction between standard and custom field. In addition, the mapping system tracks updates to the logical data and then updates the corresponding physical data. The mapping system may keep a log of the updates that are made to the logical data. The mapping system uses the map to identify which standard fields and custom fields need to be updated and updates them accordingly. In this way, the distinction between standard fields and custom fields is hidden from the logical data view and updates made to the logical data view can be reflected in the physical data.

In one embodiment, the mapping system maps a physical table of a database to a logical table representing a logical view that integrates standard columns and custom columns. The physical table includes a standard table with standard columns and a custom table with custom columns. The custom table may be implemented as a pivot table. The mapping system provides a map between standard and custom columns and logical columns. The map may include for each logical column of the logical table an indication of the corresponding standard column and standard table or an indication of the corresponding custom column. The pivot table may include a key column, custom column name column, and data column. The set of unique custom column names within the custom column name column of the pivot table represents all the custom columns that have been defined for the physical table. In one embodiment, the name of the pivot table and its column names may be hard-coded into the mapping system. Alternatively, the map may map each logical column that corresponds to a custom column to the name of the corresponding pivot table and the names of the columns within the pivot table corresponding to the key, custom column name, and data columns. The mapping system may represent a logical table as a dataset object that defines a logical view and methods for accessing the logical data. (See, D. Michalk, "The DataSet Object: At Your Web Service," XML & Web Services Magazine, October/November 2001, which is hereby incorporated by reference.) The mapping system may add functionality to the dataset object to track changes that are made to the data within the dataset object. When the changes made to the logical table are to be committed to the physical table, the mapping system processes each change by mapping the updated columns of the logical table to the corresponding physical columns of the physical table. The updated columns may correspond to standard columns or custom columns. If an updated column corresponds to a custom column, then the mapping system updates the corresponding pivot table as appropriate.

In one embodiment, the physical table may include multiple standard tables, for example, if the database limits the number of columns within a table to less than the number needed to represent all the properties of an entity. The mapping system allows for individual standard tables to be updated, rather than updating all the columns across all the standard tables for a row. Prior techniques for updating a view that included a join of multiple tables may have required that all the columns of all the tables be updated even when only a single column of the view is updated. The mapping system may also define a logical table to contain logical columns corresponding to different physical tables. For example, a logical table may contain a row for each task with logical columns corresponding to various physical columns of the task physical table and a physical column for the project physical table.

FIG. 1 is a block diagram that illustrates a physical table of a database representing an entity and a corresponding logical table in one embodiment. The physical table 110 includes standard tables 111-112 and a custom table 113. Each standard table includes a unique key standard column and other standard columns that each correspond to a property of the entity represented by the physical table. The custom table is implemented as a pivot table 114. The custom table, however, logically includes a unique key column and each custom column. A row of the physical table for a specific entity, identified by a unique identifier, corresponds to a join of the standard tables and the custom table. The mapping system generates the logical table 120, which may be represented as a dataset object, corresponding to the physical table by creating a logical join of the standard tables and the custom table. The join with the custom table is logical in the sense that the custom table is a logical representation of the pivot table. The mapping system converts the rows of the pivot table to the corresponding column of the custom table to effect the logical join.

Figure 2:
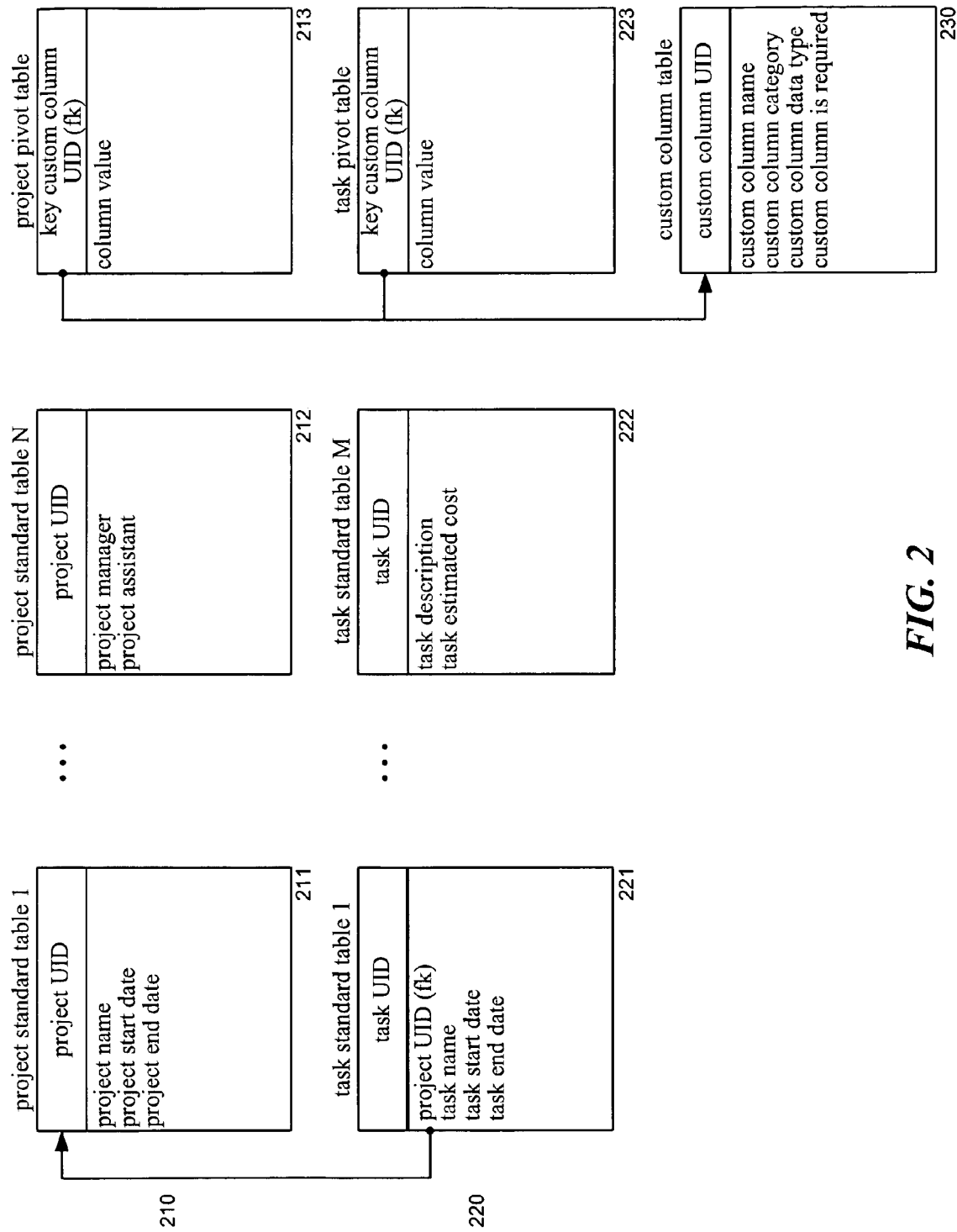
FIG. 2 is a block diagram that illustrates physical tables for a project management application in one embodiment.

FIG. 2 is a block diagram that illustrates physical tables for a project management application in one embodiment. The physical tables include a project table 210 corresponding to a project entity and a task table 220 corresponding to a task entity. The project table includes project standard tables 211-212 and project pivot table 213. The task table includes task standard table 221-222 and task pivot table 223. The project standard tables contain a unique project identifier column and various standard columns relating to project properties. The project pivot table contains an entry for each cell of the project table that contains a custom value. The project pivot table includes a key column that contains the project unique identifier, the custom column unique identifier column, and a data column. The custom column unique identifier column is a reference to a row in a custom column table 230. The custom column table contains a row for each custom column that has been defined. Each row contains name, category, and data type of a custom column. The task standard tables contain a task unique identifier column and various standard columns relating to task properties. The task pivot table contains an entry for each cell of the task table in a manner similar to the project pivot table.

FIG. 3 is a block diagram that illustrates sample data of a project custom table represented as a project pivot table and custom column table in one embodiment. The custom column table 320 includes rows 321-322. Row 321 defines the custom column "project" with a data type of "text" and an indication that the column is required to have a data value. Row 322 defines the custom column "status" with the data type of "text" and an indication that the column is not required to have a data value. The project pivot table 310 includes rows 311-313. Row 311 corresponds to the cell for the "type" custom column for project 10. This row indicates that project 10 has a type of "A." Row 312 corresponds to the cell for the "type" custom column for project 20. This row indicates that project 20 has a type of "B." Row 313 corresponds to the cell for the "status" custom column for project 10. This row indicates that project 10 has a status of "done." The custom column unique identifier column of the project pivot table contains a foreign key to the custom column table. The custom column table thus contains a row for each custom column describing its characteristics.

Figure 4:
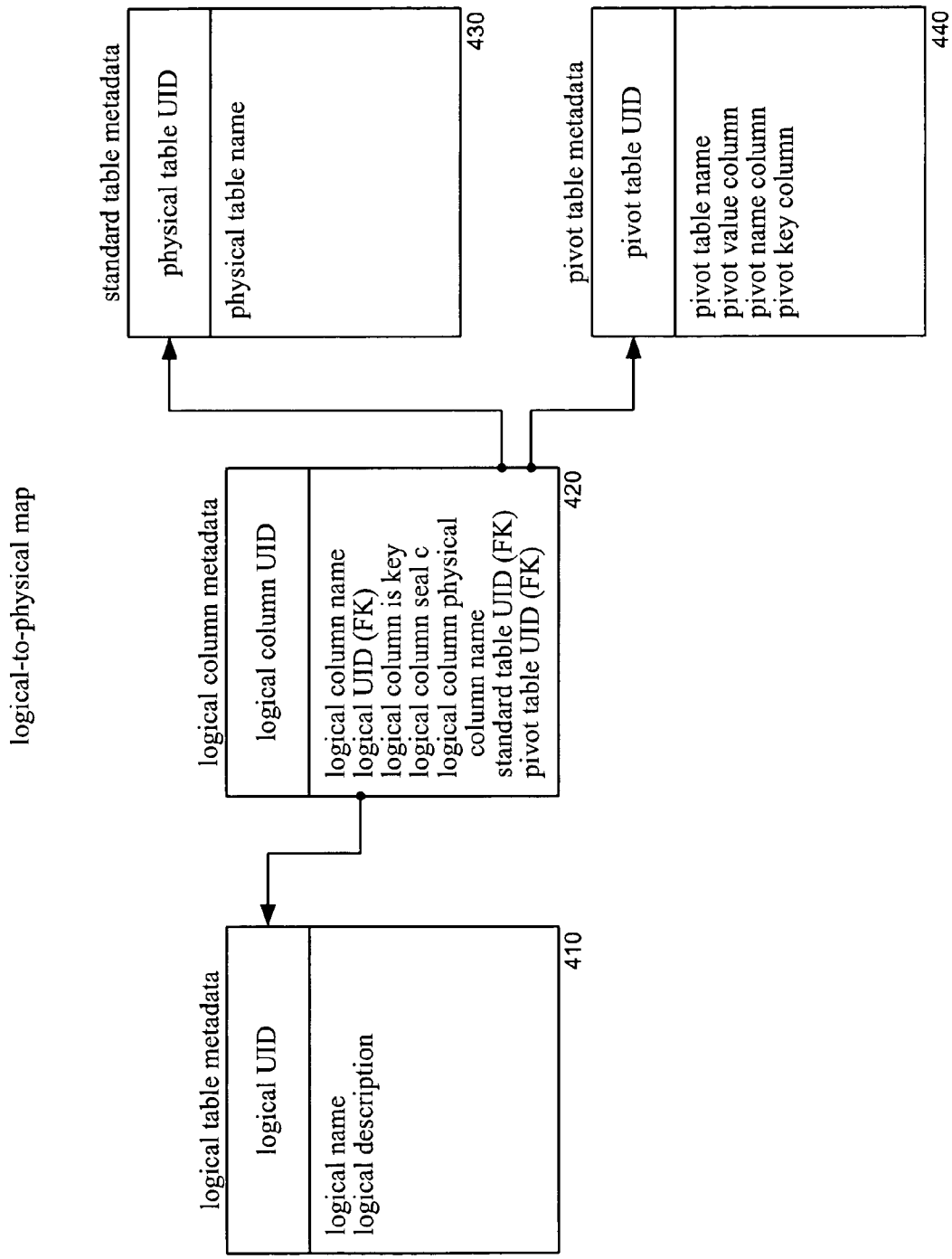
FIG. 4 is a block diagram that illustrates a schema for a map of logical data to physical data in one embodiment.

FIG. 4 is a block diagram that illustrates a schema for a map of logical data to physical data in one embodiment. The schema defines logical table metadata 410, logical column metadata 420, standard table metadata 430, and pivot table metadata 440. The logical table metadata contains a row for each logical table corresponding to a physical table. In one embodiment, a logical table may be generated from multiple physical tables. The logical table metadata contains logical unique identifier, name, and description columns. The logical column metadata contains a row for each logical column. It includes a logical column unique identifier, name, logical table unique identifier (as a foreign key), is key, is calculated, physical column name, standard table unique identifier (as a foreign key), and pivot table unique identifier (as a foreign key) columns. The logical table unique identifier column maps the logical column to the corresponding logical table in which it is contained. The standard table unique identifier column maps the logical column to the corresponding standard table. The pivot table unique identifier maps the logical column to the corresponding row of the pivot table. The physical column name contains the column name associated with either the standard table or the pivot table. The standard table metadata has one row for each standard table and includes a physical table unique identifier and name column. The name identifies the name of the physical table. The pivot table metadata includes a row for each custom column and contains a pivot table unique identifier, name, value column, name column, and key column columns. The table name column specifies the name of the pivot table. The value column identifies the name of the column of the pivot table that contains the data value. The name column identifies the column of the pivot table that contains the name of the custom column. The key column identifies the column of the pivot that contains the key of the corresponding physical table.

Figure 5:
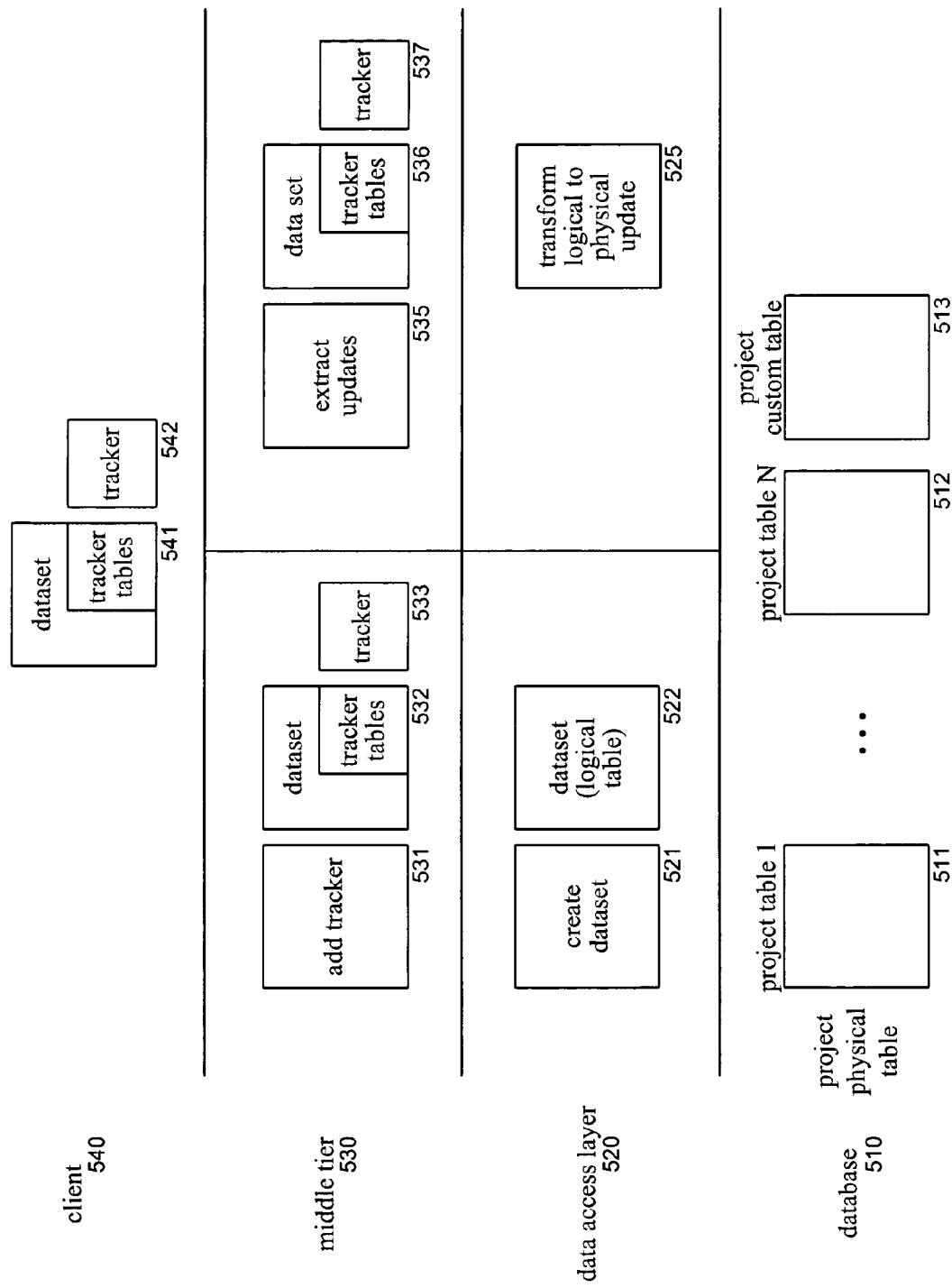
FIG. 5 is a block diagram illustrating the interaction of components of the mapping system in one embodiment.

FIG. 5 is a block diagram illustrating the interaction of components of the mapping system in one embodiment. The figure illustrates a database layer 510, a data access layer 520, a middle tier 530, and a client 540. The database may be connected to the data access layer via a network, and the client may be connected to the middle tier via a network. The database includes a project physical table comprising project standard tables 511-512 and a project custom table 513. When a result set is generated for the project physical table, it is passed to the create dataset component 521 of the data access layer. If a network connects the database and the data access layer, then data sent via the network would typically need to be serialized and de-serialized. The create dataset component uses the logical-to-physical map to create a dataset object 522 that represents the logical table. The dataset object is passed to the add tracker component 531 of the middle tier. The add tracker component adds tracker tables to the dataset object 532 and adds tracker object 533. The tracker object is responsible for tracking each update to the logical table of the dataset objects and storing an indication of the update in the tracker tables. The dataset object is then serialized (when the middle tier and client are connected via a network) and provided to the client. The client de-serializes the dataset object and instantiates dataset object 541 and tracker object 542. The client accesses the dataset object to view and update to the logical tables of the dataset object. The tracker object logs all updates, such as updating a cell, adding a row, or deleting a row. Upon completion, the client serializes the dataset object and provides it to the middle tier. The middle tier de-serializes the dataset object and instantiates a dataset object 536 and tracker object 537. The extract updates component extracts the update information from the tracker tables and provides that information to the transform logical to physical update component 525 of the data access layer. The transform logical to physical update component uses the logical-to-physical map to generate updates to the project physical table corresponding to the updates made by the client to the logical table. The component may generate a series of SQL statements.

The computing device on which the mapping system is implemented may include a central processing unit, memory, input devices (e.g., keyboard and pointing devices), output devices (e.g., display devices), and storage devices (e.g., disk drives). The memory and storage devices are computer-readable media that may contain instructions that implement the mapping system. In addition, the data structures and message structures may be stored or transmitted via a data transmission medium, such as a signal on a communications link. Various communications links may be used, such as the Internet, a local area network, a wide area network, or a point-to-point dial-up connection.

FIG. 5 illustrates an example of a suitable operating environment in which the mapping system may be implemented. The operating environment is only one example of a suitable operating environment and is not intended to suggest any limitation as to the scope of use or functionality of the mapping system. Other well-known computing systems, environments, and configurations that may be suitable for use include personal computers, server computers, handheld or laptop devices, multiprocessor systems, microprocessor-based systems, programmable consumer electronics, network PCs, minicomputers, mainframe computers, distributed computing environments that include any of the above systems or devices, and the like.

The mapping system may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Figure 6:
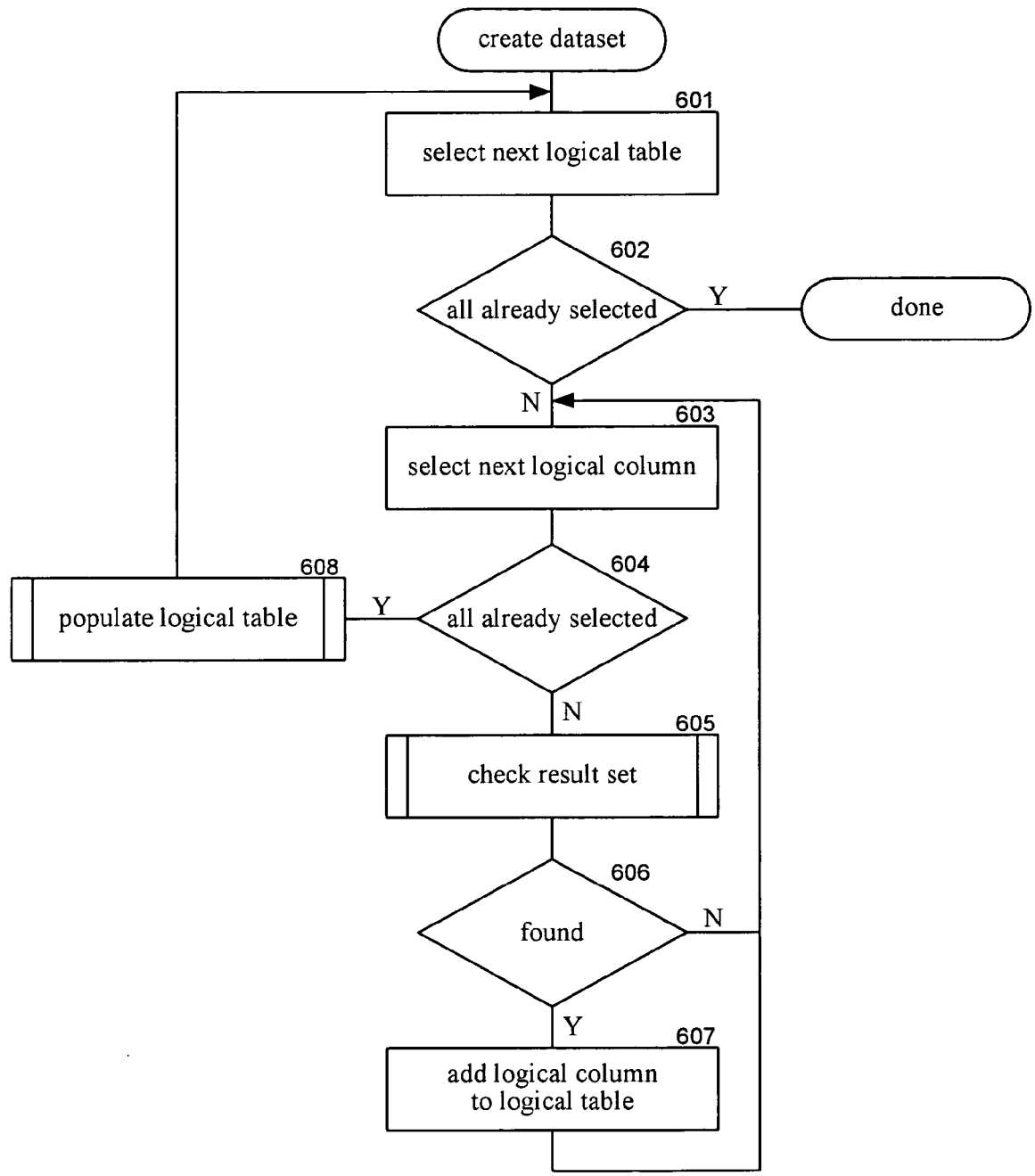
FIG. 6 is a flow diagram that illustrates the create dataset object component in one embodiment.

FIG. 6 is a flow diagram that illustrates the create dataset object component in one embodiment. The component is passed a result set and creates a dataset object representing a logical view of the result set. In this embodiment, the component selects each logical table and logical column of the logical table and adds a column to that logical table if the corresponding physical column is represented in the result set. One skilled in the art will appreciate that selecting each of the physical columns of the result set can alternatively identify the logical columns for the logical tables. In block 601, the component selects the next logical table that is defined in the logical-to-physical map. In decision block 602, if all the logical tables have already been selected, then the component completes, else the component continues at block 603. In block 603, the component selects the next logical column of the selected logical table. In decision block 604, if all the logical columns of the selected logical table have already been selected, then the component continues at block 608, else the component continues at block 605. In block 605, the component invokes the check result set component to determine whether the physical column corresponding to the selected logical column is in the result set. In decision block 606, if the physical column is in the result set, then the component continues at block 607, else the component loops to block 603 to select the next logical column. In block 607, the component adds the selected logical column to logical table and then loops to block 603 to select the next logical column. In block 608, the component invokes the populate logical table component to add rows to the logical table that are generated from the result set and loops to block 601 to select the next logical table.

Figure 7:
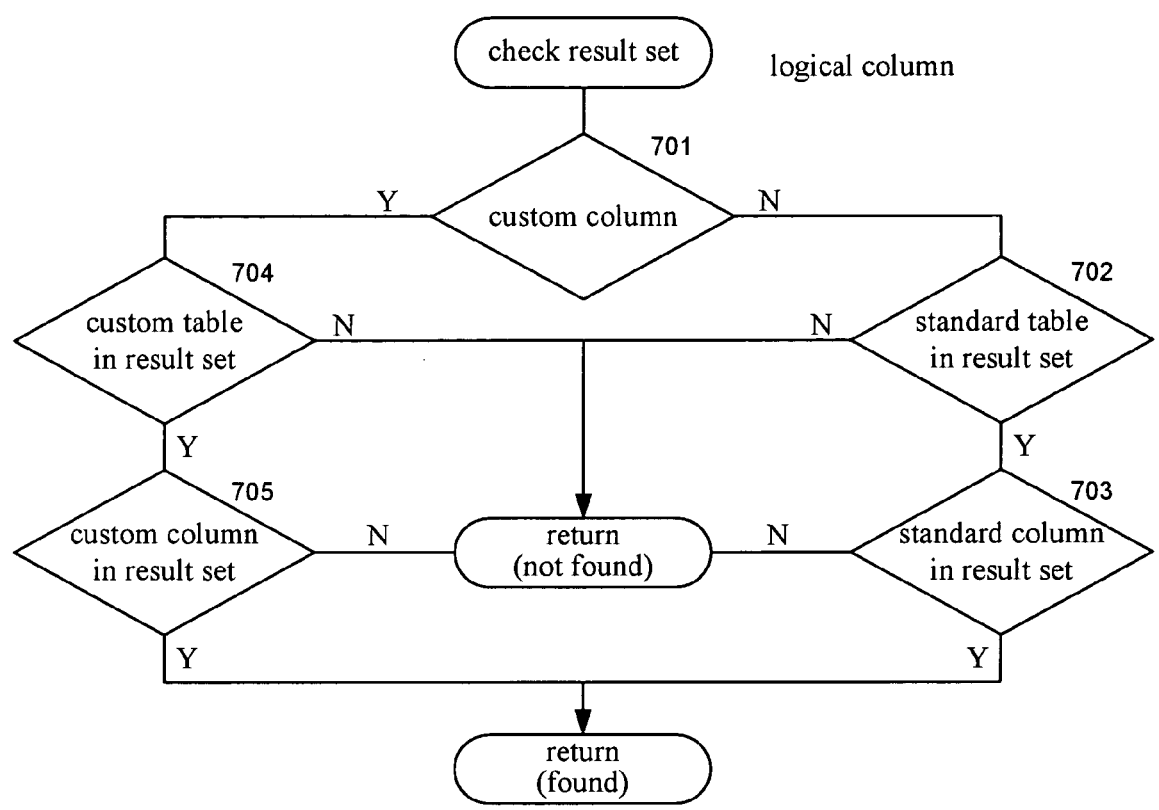
FIG. 7 is a flow diagram that illustrates the processing of the check result set component in one embodiment.

FIG. 7 is a flow diagram that illustrates the processing of the check result set component in one embodiment. This component is passed an indication of a logical column and returns an indication as to whether the corresponding physical column is in the result set. In decision block 701, if the logical column corresponds to a custom column, then the component continues at block 704, else the component continues at block 702. In decision block 702, if the standard table that contains the standard column corresponding to the logical column is in the result set, then the component continues at block 703, else the component returns an indication of not found. In decision block 703, if the standard column corresponding to the logical column is in the result set, then the component returns an indication of found, else the component returns an indication of not found. In decision block 704, if the custom table corresponding to logical column is in the result set, then the component continues at block 705, else the component returns an indication of not found. In decision block 705, if the custom column corresponding to logical column is in the result set, then the component returns an indication of found, else the component returns an indication of not found.

Figure 8:
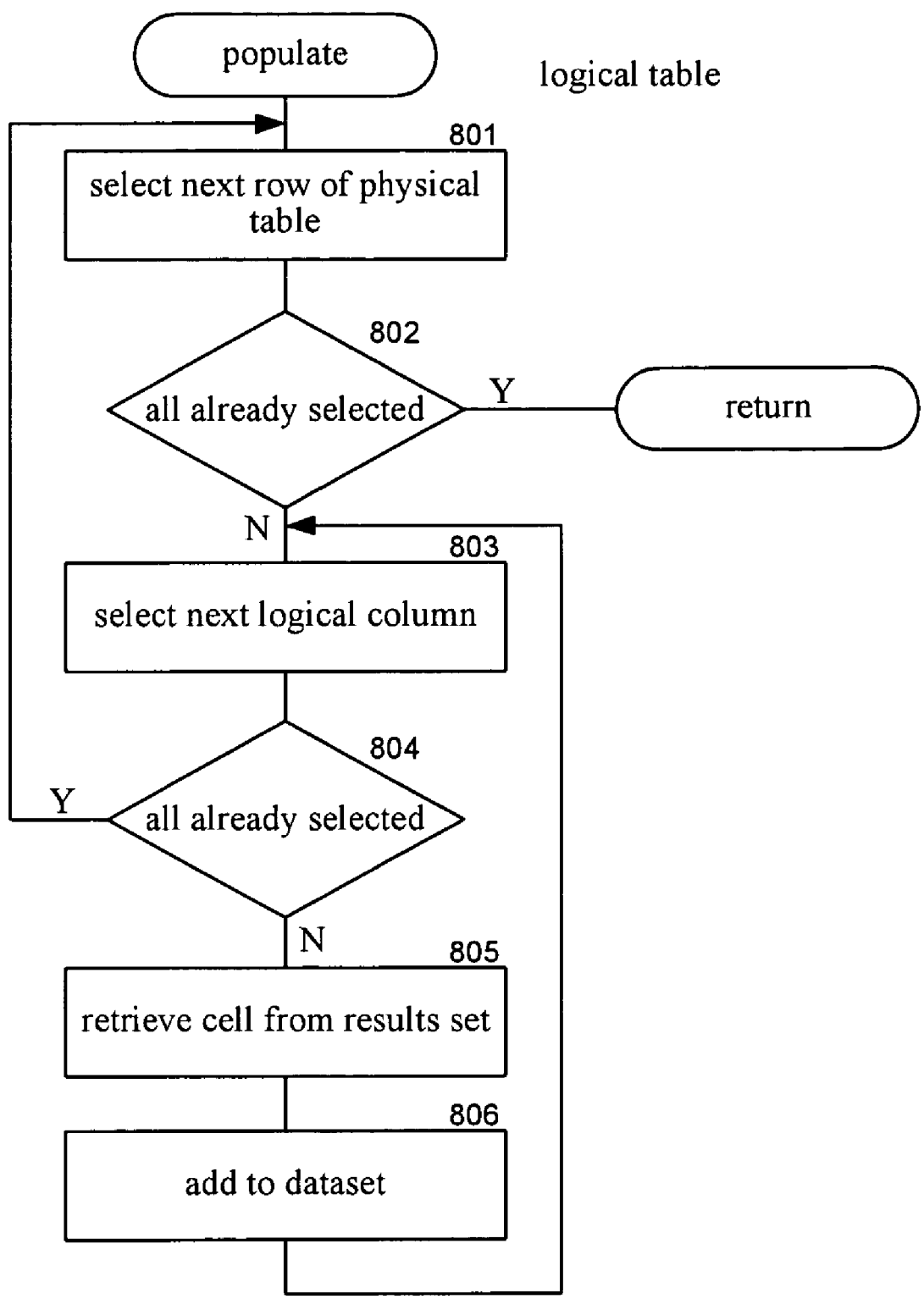
FIG. 8 is a flow diagram that illustrates the processing of the populate logical table component in one embodiment.

FIG. 8 is a flow diagram that illustrates the processing of the populate logical table component in one embodiment. The component is passed an indication of a logical table of the dataset object and adds rows to the logical table corresponding to the data of the result set. In block 801, the component selects the next row of the physical table corresponding to the logical table. In decision block 802, if all the rows of the physical table have already been selected, then the component returns, else the component continues at block 803. In block 803, the component selects the next logical column of the logical table. In decision block 804, if all the logical columns of the logical table have already been selected, then the component loops to block 801 to select the next row of the physical table, else the component continues at block 805. In block 805, the component retrieves the data of the cell from the result set for the selected logical column of the selected row of the physical table. In block 806, the component adds retrieved data to logical column of the logical table and then loops to block 803 to select the next logical column.

Figure 9:
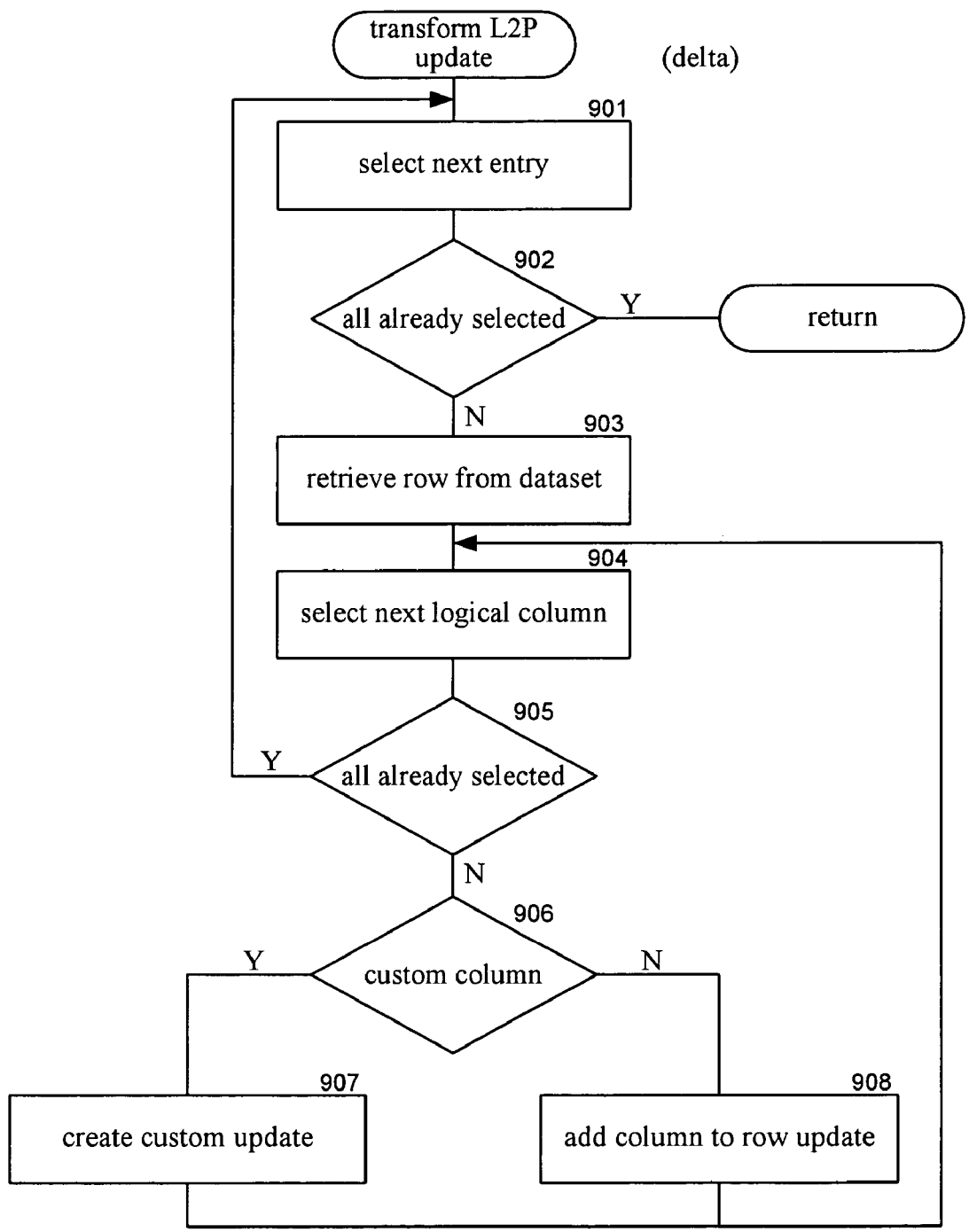
FIG. 9 is a flow diagram that illustrates the processing of the transform logical to physical update component in one embodiment.

FIG. 9 is a flow diagram that illustrates the processing of the transform logical to physical update component in one embodiment. The component is passed a delta data structure that defines various updates to the logical table. The delta data structure contains an entry for each update of a logical table. Each entry identifies a logical table that was updated, logical columns of the logical table that were updated, an operation (e.g., update, delete, or add), and the name of a key and its value which specify the specific row of the logical table that was updated. The entry also contains for each logical column indications of whether to generate a new identifier for this column, whether the data was null before the update, and whether the data is null after the update. In block 901, the component selects the next entry specified in the delta data structure. In decision block 902, if all the entries of the delta data structure have already been selected, then the component returns, else the component continues at block 903. In block 903, the component retrieves the row from the dataset object corresponding to the updated row of the logical table of the selected entry. In block 904, the component selects the next logical column specified in the delta data structure for the selected entry. In block 905, if all the logical columns have already been selected, then the component loops to block 901 to select the next entry of the delta data structure, else the component continues at block 906. In decision block 906, if the selected logical column is a custom column, then the component continues at block 907, else the component continues at block 908. In block 907, the component generates update instructions (e.g., SQL statements) for the database to update the pivot table for the custom column corresponding to the selected logical column and then loops to block 904 to select the next logical column. In block 908, the component adds a column to a row update instruction for the standard table that contains the logical column. The component then loops to block 904 to select the next logical column.

The Pseudo Code Table contains sample pseudo code for generating the instructions to update the physical table based on the delta data structure.

Pseudo Code Table

```
1.  GenerateSqlFromDelta( )
2.  {
3.  For each entry in delta
4.      Read operation
5.      Read all keys into collection accessible by name
6.      Read all columns into collection accessible by name
7.
8.      For each standard or custom table of the logical table being updated
9          If table is a custom table
10.             For each column in the custom table
11.                 Call GeneratePivotUpdate(operation, keys, update)
12.             Next
13.         Else
14.             For each column in the standard table
15.                 Add column name and update value to update list
16.             Next
```

| Pseudo Code Table |
|---|
| -continued |

```
17.
18.            Call GenerateUpdate(operation, keys, update list)
19.        Endif
20.     Next
21. Next
22. }
23.
24. GeneratePivotUpdate(operation, keys, update)
25. {
26.     Lookup pivot table definition (definition defines key columns + name
    column)
27.
28.     If the operation is an update, generate an insert if the value is currently null,
    an update if it is going from a value to another value, and generate a delete if it
    changes from a value to null.
29.
30.     Inserts and deletes generate insert and delete statements respectively.
31. }
32.
33  GenerateUpdate(operation, keys, updatelist)
34. {
35.     Generate where clause from keys
36.
37.     If operation is delete
38.         Generate delete statement only using keys.
39.     Else
40.         If operation is insert
41.             Generate insert using keys and update list as values.
42.         Else
43.     Generate update using update list and use where clause from earlier in
         function.
44.
45.         Endif
46.     Endif
47. }
```

One skilled in the art will appreciate that although specific embodiments of the mapping system have been described herein for purposes of illustration, various modifications may be made without deviating from the spirit and scope of the invention. One skilled in the art will appreciate that a pivot table can be organized in many different ways. For example, multiple entities can share a common pivot table or each entity can have its own pivot table. Also, a pivot table can be represented as a single database table or multiple database tables. A pivot table contains data for the custom columns of a physical table without having a database column for each custom column. Accordingly, the invention is not limited except by the appended claims.

We claim:

1. A method in a computer system for providing a view of data, the method comprising:
   providing physical data having standard and custom data, the standard data having entries with data for standard fields, the custom data having data for custom fields, the custom fields being represented by pivot data;
   providing a map between standard and custom fields and logical fields of logical data;
   providing a result set containing physical data from a standard field and a custom field;
   organizing the physical data of the result set into logical data using the provided map; and
   storing the organized logical data as the view.

2. The method of claim 1 wherein the physical data, the custom data, the pivot data, and the logical data are represented as tables, the tables having rows and columns.

3. The method of claim 2 where each row of the pivot table identifies a custom column, a row of the physical table, and data for the custom column of the identified row of the physical table.

4. The method of claim 2 wherein the map maps columns of the logical table to the corresponding standard column or custom column.

5. The method of claim 4 wherein the map of a logical column includes an identifier of the custom column used by the pivot data.

6. The method of claim 2 wherein when the logical table is updated, updating the standard table and the custom table.

7. The method of claim 2 wherein the physical table comprises multiple standard tables with standard columns and when a logical column of the logical table is updated, updating only the standard table including the corresponding standard column.

8. The method of claim 2 wherein when the updating of the logical table includes adding data for a custom column of a logical row, adding a row to the pivot table for the custom column of the physical row corresponding to the logical row.

9. The method of claim 2 wherein when the updating of the logical table includes updating data for a custom column of a logical row, updating a row of the pivot table for the custom column of the physical row corresponding to the logical row.

10. A computer-readable storage medium containing a data structure for mapping between a logical table and a physical table, the physical table including a standard table and a custom table, the data structure comprising:
   for each logical column of the logical table, when the logical column corresponds to a standard column of the standard table, mapping the logical column to the corresponding standard column; and when the logical column corresponds to a custom column of the custom table, mapping the logical column to the corresponding custom column, the custom table being represented by a pivot table;

instructions for generating a logical view of physical data using the mapping; and instructions for storing the generated view.

11. The computer-readable storage medium of claim 10 wherein the pivot table includes for each custom column, a row for each row of the physical table including data for the each custom column.

12. The computer-readable storage medium of claim 10 wherein each mapping of a logical column includes a name for the logical column, an indication of whether the corresponding standard column is a key of the standard table of the corresponding standard column, a name for the corresponding physical column, and a indication of either the standard table or the custom table.

13. The computer-readable storage medium of claim 10 wherein the mapping of the logical column to the corresponding custom column includes a name of the corresponding pivot table, an identifier of a pivot column containing a name of the custom column, an identifier of a pivot column containing data of the custom column, and an identifier of a pivot column containing a key for a physical row.

14. A computer-readable storage medium containing instructions for controlling a computer system to update data, by a method comprising:

providing a map between standard and custom columns of a physical table and logical columns of a logical table, the custom columns being represented using a pivot table;

providing an indication of an update to the logical table;

using the map to determine the standard column or custom column to which an updated logical column corresponds; and effecting the update of the determined column of the physical table.

15. The computer-readable storage medium of claim 14 wherein when the determined column is a custom column updating a row of the pivot table.

16. The computer-readable storage medium of claim 15 wherein each row of the pivot table identifies a custom column, a row of the physical table, and data for the identified custom column of the identified row of the physical data.

17. The computer-readable storage medium of claim 14 wherein the logical table is generated by providing a result set containing physical data retrieved from standard and custom columns of the physical table and the map is used to map the retrieved physical data to the corresponding logical data of the logical table.

18. The computer-readable storage medium of claim 17 wherein the logical table is represented as a dataset object.

19. The computer-readable storage medium of claim 18 including adding tracker tables to the dataset object to log updates to the logical table.

20. The computer-readable storage medium of claim 14 wherein the physical table includes multiple standard tables and the updating includes updating only those standard tables with standard columns corresponding to logical columns that were updated.

21. A computer-readable storage medium containing instructions for controlling a computer system to update data, by a method comprising:

providing a map between physical columns of a physical table and logical columns of a logical table, the physical table being represented a multiple database tables within a database;

providing a result set containing physical data derived from the multiple database tables;

organizing the physical data of the result set into a logical table based on the provided map;

providing an indication of an update to the logical table, the update updating logical columns corresponding to physical columns represented in different database tables;

using the provided map to determine to which columns of which database tables the updated logical columns correspond; and effecting the update of the determined columns of the database tables.

22. The computer-readable storage medium of claim 21 wherein the database tables correspond to standard tables and a custom table, the custom table being represented by a pivot table.

23. The computer-readable storage medium of claim 22 wherein when a determined column is a custom column of the custom table, updating a row of the pivot table.

24. The computer-readable storage medium of claim 22 wherein each row of the pivot table identifies a custom column, a row of the physical table, and data for the identified custom column of the identified row of the physical data.

25. The computer-readable storage medium of claim 21 wherein the logical table is represented as a dataset object.

26. The computer-readable storage medium of claim 25 including adding tracker tables to the dataset object to log updates to the logical table.

27. The computer-readable storage medium of claim 21 wherein the physical table includes multiple standard tables and the updating includes updating only those standard tables with standard columns corresponding to logical columns that were updated.

* * * * *